United States Patent
Wenzel et al.

(10) Patent No.: US 12,550,817 B2
(45) Date of Patent: *Feb. 17, 2026

(54) LAWNMOWER WITH FRONT AXLE ASSEMBLY

(71) Applicant: Briggs & Stratton, LLC, Wauwatosa, WI (US)

(72) Inventors: Philip H. Wenzel, Vernon Center, NY (US); Robert S. Laurin, Durhamville, NY (US); E. Mark Lynch, Munnsville, NY (US); Brian Crossway, Waterville, NY (US); Derrick R. Camenga, Sherburne, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 697 days.

This patent is subject to a terminal disclaimer.

(21) Appl. No.: 17/954,877

(22) Filed: Sep. 28, 2022

(65) Prior Publication Data

US 2023/0018540 A1   Jan. 19, 2023

Related U.S. Application Data

(63) Continuation of application No. 16/053,262, filed on Aug. 2, 2018, now Pat. No. 11,470,773.

(Continued)

(51) Int. Cl.
*A01D 34/74* (2006.01)
*A01D 34/66* (2006.01)
(Continued)

(52) U.S. Cl.
CPC ............. *A01D 34/74* (2013.01); *A01D 34/66* (2013.01); *A01D 34/661* (2013.01);
(Continued)

(58) Field of Classification Search
CPC .... B60G 2200/324; B60G 9/02; B60G 21/05; B60G 2300/084; A01D 2034/645;
(Continued)

(56) References Cited

U.S. PATENT DOCUMENTS 1,826,113 A   10/1931   Winsor
2,300,844 A   11/1942   Olley
(Continued)

FOREIGN PATENT DOCUMENTS

EP   1 532 009 B1   6/2012

OTHER PUBLICATIONS

Hurricane Power, Commercial debris Blower, Z3 Parts Manual, Oct. 2017.

*Primary Examiner* — Adam J Behrens
(74) *Attorney, Agent, or Firm* — Foley & Lardner LLP (57) ABSTRACT

A lawnmower includes a frame, a pair of drive wheels, a front axle assembly, a first caster wheel, a second caster wheel, a first rod, a second rod, and a mower deck. The pair of drive wheels are coupled to a second end portion of the frame. The front axle assembly includes a bar pivotally coupled to a first end portion of the frame about a pivot axis. The first caster wheel is coupled to a first lateral end of the bar. The second caster wheel is coupled to a second lateral end of the bar. The first rod is coupled between the frame and the first lateral end of the bar. The second rod is coupled between the frame and the second lateral end of the bar. When the bar pivots about the pivot axis, the first caster wheel and the second caster wheel move relative to the frame.

20 Claims, 5 Drawing Sheets

Related U.S. Application Data (60) Provisional application No. 62/540,206, filed on Aug. 2, 2017.

(51) Int. Cl.
*A01D 34/86* (2006.01)
*B60G 9/02* (2006.01)
*B60G 21/05* (2006.01)
*A01D 101/00* (2006.01)

(52) U.S. Cl.
CPC ............ *A01D 34/662* (2013.01); *A01D 34/86* (2013.01); *B60G 9/02* (2013.01); *B60G 21/05* (2013.01); *A01D 2101/00* (2013.01); *B60G 2200/324* (2013.01); *B60G 2300/084* (2013.01)

(58) Field of Classification Search
CPC .... A01D 2101/00; A01D 34/66; A01D 34/74; A01D 34/662; A01D 34/661; A01D 34/86; A01D 75/28; A01D 75/287
See application file for complete search history.

(56) References Cited

U.S. PATENT DOCUMENTS

| | | | |
|---|---|---|---|
| 2,417,019 A | 3/1947 | Sherman | |
| 2,633,204 A | 3/1953 | Keller | |
| 2,805,079 A | 9/1957 | Vostrez | |
| 2,838,124 A | 6/1958 | Cramer, Jr. | |
| 2,904,341 A | 9/1959 | Heitshu | |
| 3,408,798 A * | 11/1968 | Hale | A01D 75/28 180/41 |
| 3,669,467 A | 6/1972 | Dunlap et al. | |
| 3,703,298 A | 11/1972 | Laverda | |
| 3,706,186 A * | 12/1972 | Hurlburt | A01D 34/74 56/15.8 |
| 3,758,130 A | 9/1973 | Mead | |
| 3,777,459 A * | 12/1973 | Elliott | A01D 34/866 56/16.2 |
| 3,792,748 A | 2/1974 | Regier | |
| 3,876,012 A | 4/1975 | Regier | |
| 4,108,089 A | 8/1978 | van der Lely | |
| 4,416,109 A | 11/1983 | Slazas | |
| 4,657,271 A | 4/1987 | Salmon | |
| 4,838,373 A | 6/1989 | Price et al. | |
| 4,876,846 A * | 10/1989 | Torras | A01D 75/28 56/16.2 |
| 5,065,568 A | 11/1991 | Braun et al. | |
| 5,079,926 A * | 1/1992 | Nicol | A01D 34/74 404/91 |
| 5,355,665 A | 10/1994 | Peter | |
| 5,367,864 A | 11/1994 | Ogasawara et al. | |
| 5,475,971 A | 12/1995 | Good et al. | |
| 5,765,846 A | 6/1998 | Braun | |
| 5,809,756 A | 9/1998 | Scag et al. | |
| 5,909,887 A | 6/1999 | Hobrath | |
| 5,946,893 A | 9/1999 | Gordon | |
| 5,946,894 A | 9/1999 | Eavenson et al. | |
| 5,947,505 A | 9/1999 | Martin | |
| 6,012,274 A * | 1/2000 | Eavenson | A01D 34/81 56/320.1 |
| 6,062,333 A * | 5/2000 | Gordon | B60B 33/0005 180/311 |
| 6,098,388 A | 8/2000 | Davies | |
| 6,170,242 B1 | 1/2001 | Gordon | |
| 6,226,966 B1 * | 5/2001 | Eavenson | A01D 34/81 56/2 |
| 6,244,025 B1 | 6/2001 | Ferris et al. | |
| 6,266,949 B1 | 7/2001 | Eavenson et al. | |
| 6,276,119 B1 | 8/2001 | Oshima et al. | |
| 6,394,216 B1 | 5/2002 | Gordon | |
| 6,434,919 B2 * | 8/2002 | Schick | A01D 34/64 56/15.9 |
| 6,460,318 B1 | 10/2002 | Ferris et al. | |
| 6,510,678 B2 | 1/2003 | Ferris et al. | |
| 6,516,597 B1 * | 2/2003 | Samejima | A01D 34/662 56/16.7 |
| 6,588,188 B2 | 7/2003 | Dennis | |
| 6,675,567 B2 | 1/2004 | Samejima et al. | |
| 6,698,172 B2 | 3/2004 | Ferris et al. | |
| 6,739,116 B2 | 5/2004 | Stover et al. | |
| 6,796,568 B2 * | 9/2004 | Martis | A61G 5/06 267/152 |
| 6,857,254 B2 | 2/2005 | Melone et al. | |
| 6,988,351 B2 * | 1/2006 | Schick | A01D 34/662 56/15.9 |
| 7,028,456 B2 | 4/2006 | Thatcher | |
| 7,107,746 B2 * | 9/2006 | Melone | A01D 34/661 56/15.8 |
| 7,152,389 B2 | 12/2006 | Melone et al. | |
| 7,374,187 B2 | 5/2008 | Melone et al. | |
| 7,416,188 B2 | 8/2008 | Segerljung | |
| 7,516,805 B2 | 4/2009 | Bedford et al. | |
| 7,546,723 B2 | 6/2009 | Melone et al. | |
| 7,596,936 B2 * | 10/2009 | Schick | A01D 34/74 56/15.9 |
| 7,610,739 B2 | 11/2009 | Godfrey | |
| 7,669,394 B2 | 3/2010 | Finkner et al. | |
| 7,841,044 B1 | 11/2010 | Weihl et al. | |
| 7,866,671 B2 | 1/2011 | Madler | |
| 7,877,973 B2 | 2/2011 | Godfrey | |
| 7,918,305 B2 * | 4/2011 | Scherbring | B62D 5/06 180/408 |
| 7,930,813 B2 | 4/2011 | Melone et al. | |
| 8,065,864 B2 | 11/2011 | Melone et al. | |
| 8,091,329 B2 * | 1/2012 | Schick | A01D 34/662 56/14.9 |
| 8,166,735 B1 | 5/2012 | Schnell | |
| 8,167,324 B2 * | 5/2012 | Piontek | F16F 7/00 16/45 |
| 8,240,423 B2 | 8/2012 | Scherbring et al. | |
| 8,397,367 B2 | 3/2013 | Melone et al. | |
| 8,528,685 B2 | 9/2013 | Scherbring et al. | |
| 9,161,490 B2 | 10/2015 | Melone et al. | |
| 9,650,024 B2 | 5/2017 | Weihl | |
| 9,707,842 B2 | 7/2017 | Melone et al. | |
| D830,420 S | 10/2018 | Covington et al. | |
| 10,093,179 B2 | 10/2018 | Melone et al. | |
| 10,207,557 B2 | 2/2019 | Bjorn et al. | |
| 10,569,609 B1 | 2/2020 | Covington et al. | |
| 10,624,261 B2 | 4/2020 | Krajewski | |
| 10,645,874 B2 | 5/2020 | Krajewski et al. | |
| 2002/0194826 A1 * | 12/2002 | Schick | A01D 34/662 56/15.9 |
| 2005/0044836 A1 * | 3/2005 | Goto | A01D 69/10 56/14.7 |
| 2014/0182258 A1 | 7/2014 | Koorn | |
| 2017/0113721 A1 | 4/2017 | Slegelis et al. | |
| 2019/0030977 A1 | 1/2019 | Beylin et al. | |

* cited by examiner

LAWNMOWER WITH FRONT AXLE ASSEMBLY

CROSS-REFERENCE TO RELATED APPLICATIONS

This application is a continuation of U.S. patent application Ser. No. 16/053,262, filed Aug. 2, 2018, which claims the benefit of and priority to U.S. Provisional Patent Application No. 62/540,206, filed Aug. 2, 2017, all of which are hereby incorporated by reference in their entireties.

BACKGROUND

The present disclosure relates generally to outdoor power equipment such as zero turn radius lawnmowers, and more particularly to a stand-on zero turn radius mower having an oscillating front axle and a mower deck configured to be movable with the oscillating front axle.

The use of zero turn radius mowers has become prevalent among both commercial and residential operators due to, for example, the mowers' maneuverability, relatively high operating speed, and wide cutting area. Many variations of zero turn radius mowers exist, including ride-on units, stand-on units, and walk-behind units. Due to their use at relatively high speeds over uneven, rough terrain, some mowers (particularly ride-on mowers) may utilize front and/or rear suspension systems in order to better provide operator comfort and improve cutting performance.

However, the inclusion of suspension systems on zero turn lawnmowers generally adds to the cost and complexity of the mower. Furthermore, some mowers are not appropriately sized and/or configured to accommodate complex suspension systems. For example, stand-on mowers often do not include suspension systems at or near the front caster wheels or rear drive wheels of the unit due to their smaller footprint relative to ride-on mowers. Additionally, the smaller footprint of stand-on mowers generally leads to a smoother experience for the operator, as the narrower stance between both the front caster wheels and the rear drive wheels may lessen the impact felt by the operator as the mower travels over uneven and/or rough terrain. For these reasons, stand-on mowers generally utilize caster wheels that are unsuspended and vertically fixed relative to the mower's frame.

While stand-on mowers have conventionally used narrower two- or three-blade mower decks than many ride-on mower units, stand-on mowers having wider (e.g. 60" to 72") mower decks are becoming more prevalent in today's marketplace. To accommodate the wider mower decks, the stand-on mower's frame must also be widened, which correspondingly widens the stance of the front caster wheels and rear drive wheels. Accordingly, this widened stance may cause one of the front caster wheels to lose contact with the ground as the unit travels over uneven and/or rough terrain leading to potential decreases in cut quality due to uneven deck travel and/or scalping of the surface to be mowed.

This patent document described devices that are intended to address the issues discussed above and/or other issues.

SUMMARY

One embodiment relates to a lawnmower having a frame, a pair of drive wheels, a front axle assembly, a first caster wheel, a second caster wheel, a first rod, a second rod, and a mower deck. The frame has a first end portion and a second end portion. The pair of drive wheels are coupled to the second end portion of the frame. The front axle assembly includes a bar pivotally coupled to the first end portion of the frame about a pivot axis. The first caster wheel is coupled to a first lateral end of the bar. The second caster wheel is coupled to a second lateral end of the bar. The first rod is coupled between the frame and the first lateral end of the bar. The second rod is coupled between the frame and the second lateral end of the bar. When the bar pivots about the pivot axis, the first caster wheel moves upward relative to the frame and the second caster wheel moves downward relative to the frame.

Another embodiment relates to a lawnmower including a frame, a pair of drive wheels, a front axle assembly, a first rod, a second rod, and a mower deck. The frame has a first end portion and a second end portion. The front axle assembly includes a bar pivotally coupled to the first end portion of the frame about a pivot pin. The first caster wheel is coupled to a first lateral end of the bar. When the bar pivots about the pivot pin, the first caster wheel pivots about the pivot pin. The second caster wheel is coupled to a second lateral end of the bar. The first rod is pivotally coupled between the frame and the first lateral end of the bar. The second rod is pivotally coupled between the frame and the second lateral end of the bar. The mower deck is coupled to the frame by a first linkage, and the mower deck is coupled to the front axle assembly by a second linkage. When the bar pivots about the pivot pin, the second caster wheel, the second linkage, and mower deck move relative to the pivot pin.

Another embodiment relates to a lawnmower having a frame, a pair of drive wheels, a front axle assembly, a pair of caster wheels, multiple rods, a first bell crank, a second bell crank, and a mower deck. The frame has a first end portion and a second end portion. The pair of drive wheels are coupled to the second end portion. The front axle assembly includes a bar pivotally coupled to the first end portion of the frame about a single axis. The pair of caster wheels are directly coupled to respective ends of the bar. The multiple rods have a first end and a second end. The first end of the multiple rods is pivotally coupled to the fame. The second end of the multiple rods is pivotally coupled to the front axle assembly. The first bell crank is pivotally coupled to the front axle assembly. The second bell crank is pivotally coupled to the frame. The mower deck is coupled to the first bell crank and the second bell crank. The multiple rods are configured to limit a degree of rotation of the front axle assembly about the single axis.

In accordance with some embodiments, a zero turn radius lawnmower is disclosed. The zero turn radius lawnmower includes a main frame having a first end portion and a second end portion. The zero turn radius lawnmower includes a pair of drive wheels operably coupled to the second end portion of the main frame. The drive wheels are configured to be driven independently in both forward and reverse directions. The zero turn radius lawnmower also includes a front axle assembly pivotally coupled to the first end portion of the main frame about a single axis. A pair of caster wheels are coupled to respective ends of the front axle assembly such that the pair of caster wheels move relative to the main frame. The zero turn radius further includes a mower deck. The mower deck is coupled to the main frame by at least one first linkage. The mower deck is also coupled to the front axle assembly by at least one second linkage.

The zero turn radius lawnmower may also include a first upper radius rod and a first lower radius rod. Each of the first upper radius rod and the first lower radius rod may be pivotally coupled at a first end to the main frame and at a second end to a first portion of the front axle assembly. The zero turn radius lawnmower may also include a second upper radius rod and a second lower radius rod. The second upper radius rod and the second lower radius rod may be pivotally coupled at a first end to the main frame and a second end to a second portion of the front axle assembly.

In some embodiments, a deck height control lever may be coupled to at least one rear bell crank and at least one front bell crank. The at least one rear bell crank and the at least one front bell crank may be coupled to the mower deck to control the height of the mower deck relative to a mowing surface. The at least one rear bell crank also may be rotatably coupled to the main frame. The at least one front bell crank also may be rotatably coupled to the front axle assembly. The at least one rear bell crank may be coupled to the mower deck by at least one spring-biased linkage. The at least one front bell crank may be coupled to the mower deck by at least one chain linkage. The deck height control lever may be coupled to the at least one rear bell crank by a mechanical decoupler linkage assembly. The at least one rear bell crank may be coupled to the at least one front bell crank by a linkage rod.

In some embodiments, the front axle assembly further includes a pivot pin about which the front axle assembly moves relative to the main frame. An elastomeric bushing may be disposed over the pivot pin. The bushing may be configured to dampen movement of the front axle assembly. A pair of limit pins may also be disposed on either side of the pivot pin. The limit pins may be spaced and oriented to contact a surface of the main frame to limit rotational travel of the front axle assembly.

In accordance with some embodiments, a stand-on lawnmower is disclosed. The stand-on lawnmower includes a main frame having a first end portion and a second end portion. The stand-on lawnmower also may include an operator standing platform positioned at the second end portion of the main frame. The stand-on lawnmower may also include a control tower positioned within reach of an operator standing on the operator standing platform. The stand-on lawnmower also may include a pair of drive wheels operably coupled to the second end portion of the main frame. The drive wheels may be configured to be driven independently. A front axle assembly pivotally coupled to the first end portion of the main frame about a pivot pin may also be included. A pair of caster wheels may be coupled to respective ends of the front axle assembly. The pair of caster wheels may move relative to the main frame with movement of the front axle assembly about the pivot pin. Additionally, a mower deck may be included. The mower deck may be coupled to the main frame by at least one first linkage. The mower deck also may be coupled to the front axle assembly by at least one second linkage.

The stand-on lawnmower may include one or more radius rods coupled to each respective end of the front axle assembly. Each of the one or more radius rods may be pivotally coupled at a first end to a respective end of the front axle assembly and at a second end to a respective side of the main frame between the first end portion and the second end portion of the main frame. The one or more radius rods may include an upper radius rod and a lower radius rod.

The stand-on lawnmower may also include a deck height control lever positioned proximate to the control tower. The deck height control lever may be coupled to at least one rear bell crank and at least one front bell crank. The at least one rear bell crank and the at least one front bell crank may be coupled to the mower deck to control the height of the mower deck relative to a mowing surface. The at least one rear bell crank may be coupled to the mower deck by the at least one first linkage. Furthermore, the at least one front bell crank may be coupled to the mower deck by the at least one second linkage. The at least one first linkage may be at least one spring-biased linkage. Also, the at least one second linkage may be at least one chain linkage.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when a mower is oriented as shown in the Figures.

Referring to FIGS. 1-5, outdoor power equipment in the form of a stand-on zero turn radius lawnmower 10 is shown. For the sake of clarity, numerous components typically associated with stand-on lawnmowers have been omitted from FIGS. 1-5, including an engine or other power head, steering and drive controls, driving belts, hydraulic drive motors, hydraulic pumps, etc. However, one of ordinary skill in the art will readily recognize that these components may be incorporated into stand-on lawnmower 10 in accordance with the embodiments described in this document. For example, U.S. Patent Application Publication No. 2016/

0152262, incorporated by reference herein in its entirety, discloses a stand-on lawnmower having the components omitted in this document.

Stand-on lawnmower 10 includes a pair of rear drive wheels 12, as well as a pair of front caster wheels 14. As is known in the art, rear drive wheels 12 may be independently drivable in both forward and reverse directions, and front caster wheels 14 may be configured to freely rotate 360° about caster assemblies 16 to allow for zero turn radius maneuvering of stand-on lawnmower 10. Rear drive wheels 12 are coupled to a drive component which is attached to the rear portion of a main frame 18, which may be formed through any appropriate means (e.g., welded, cast, etc.) and of any appropriate material (e.g., steel, aluminum, etc.). Extending vertically from main frame 18 is a control tower 28, which supports the various controls (not shown) in a position forward of and within reach of the operator when the operator is positioned on a platform (not shown) disposed to the rear of main frame 18.

A front axle assembly 20 carrying front caster wheels 14 at opposite ends thereof is pivotally coupled to another end portion of main frame 18 at a position forward and separate from main frame 18. Each respective end portion of front axle assembly 20 upon which front caster wheels 14 are coupled may be angled horizontally away from a front portion of main frame 18, thereby allowing for sufficient clearance for a mower deck, as well as providing for a desired footprint and/or wheel stance for lawnmower 10. Front axle assembly 20 includes a pivot assembly 22, which may be welded or otherwise connected to front axle assembly 20 (e.g., using fasteners, rivets, etc.).

Figure 3:
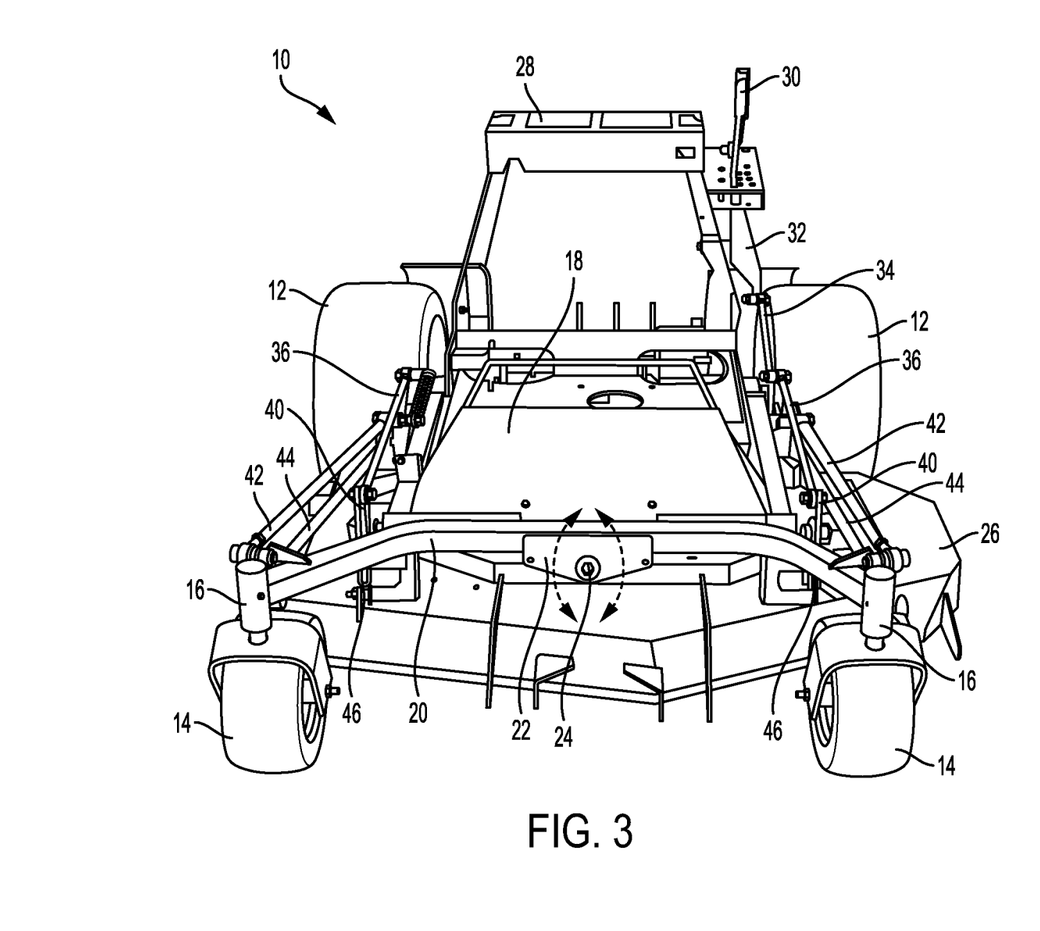
FIG. 3 is a front view of the stand-on mower illustrated in FIG. 1.
Figure 5:
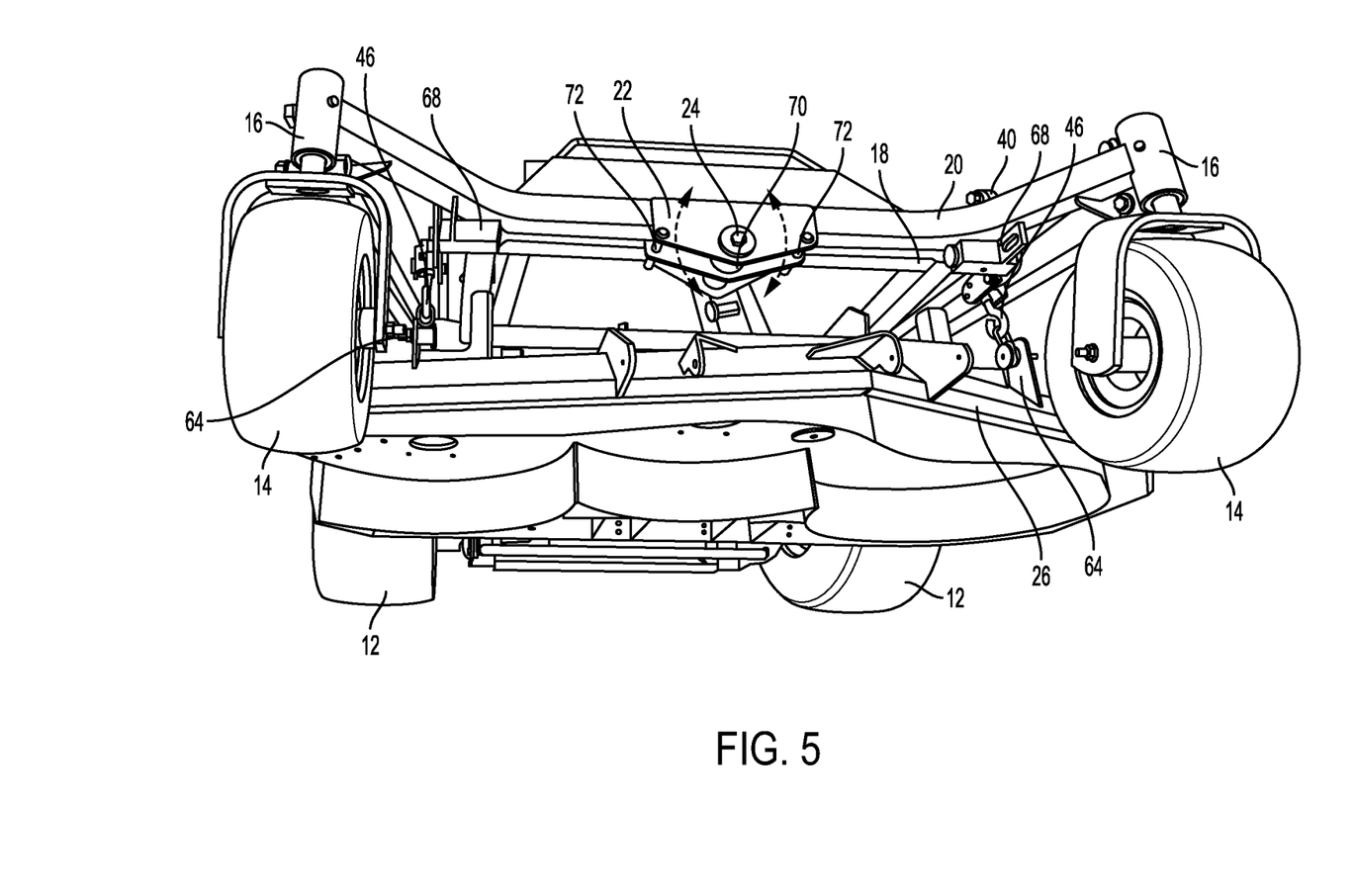
FIG. 5 is a bottom perspective view of the stand-on mower illustrated in FIG. 1.

Pivot assembly 22 includes a pivot pin 24, which provides for a single pivot axis at approximately a lateral midpoint of front axle assembly 20, about which front axle assembly 20 may move, or oscillate, in a vertical direction relative to main frame 18, as illustrated in FIG. 3 and FIG. 5. Alternatively, in some embodiments, the single pivot axis may be offset from the lateral midpoint of the front axle assembly 20. Accordingly, as stand-on lawnmower 10 travels over undulating or rough terrain, front caster wheels 14 and front axle assembly 20 are configured to move, or oscillate, with the changing terrain. This oscillation allows front caster wheels 14 to substantially remain in contact with the mowing surface, regardless of the terrain, which provides for a smoother riding experience for the operator. Additionally, traction of rear drive wheels 12 may be improved when front caster wheels 14 are better able to maintain contact with the mowing surface, as the stand-on lawnmower 10 does not abruptly tip or rock due to a front caster wheel 14 losing contact with the ground on uneven terrain. Such tipping or rocking may lead to uneven weight distribution on the rear drive wheels 12, which may negatively affect their traction. Correspondingly, by allowing the front axle assembly 20 (and front caster wheels 14) to move independently of the main frame 18, angular changes in the center of gravity of the stand-on lawnmower 10 as it travels across uneven terrain are reduced, which may increase operator comfort, cut quality, and traction of the rear drive wheels 12.

Stand-on lawnmower 10 further includes a mower deck 26 suspended below main frame 18 at a location between front caster wheels 14 and rear drive wheels 12, referred to in the art as a "mid-mount" mower deck. Mower deck 26 may include one or more mower blades (not shown), and may be configured to discharge and/or mulch grass clippings through any known method. While not shown in FIGS. 1-5, mower deck 26 may also include one or more rollers configured to follow the mowing surface when the mower deck 26 is in a lowered position relative to the main frame 18.

To control the height of mower deck 26, stand-on lawnmower 10 includes a deck height control handle 30 accessible by the operator at a location proximate to the control tower 28. Deck height control handle 30 may be coupled to an elongated deck height control lever 32, which is configured to manipulate a decoupler linkage 34 in order to incrementally adjust the height of mower deck 26 relative to the mowing surface. Specifically, a first end of decoupler linkage 34 may be pivotally coupled to deck height control lever 32, while a second end of decoupler linkage 34 may be coupled to one of a pair of rear bell cranks 38, with rear bell cranks 38 being pivotally coupled to main frame 18. Each of the rear bell cranks 38 may be coupled to a rear portion of mower deck 26 via a respective spring linkage 48 at a first end coupling, while a second end coupling on each of the rear bell cranks is pivotally coupled to a respective linkage rod 36. Linkage rods 36 extend between the rear bell cranks 38 and a respective one of a pair of front bell cranks 40. Front bell cranks 40 are coupled to a front portion of mower deck 26 via respective linkage members 46. With this configuration, operator manipulation of deck height control lever 32 effectuates upward or downward motion of mower deck 26. Accordingly, the operator may selectively set the mower deck 26 in a transport mode (i.e., highest vertical deck setting relative to the ground), or may incrementally choose a preferred cutting height using the deck height control lever 32.

Figure 1:
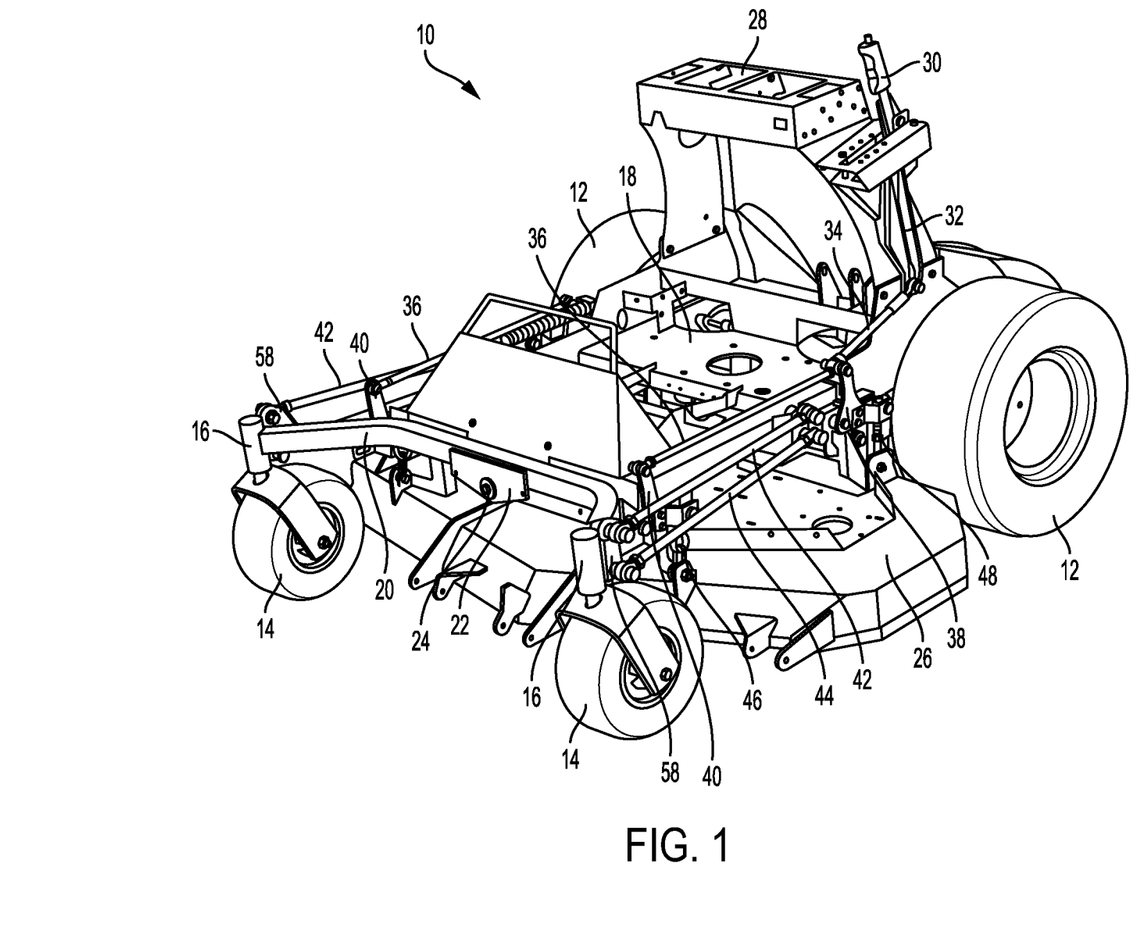
FIG. 1 is a front perspective view of a stand-on mower in accordance with an aspect of the disclosure.
Figure 2:
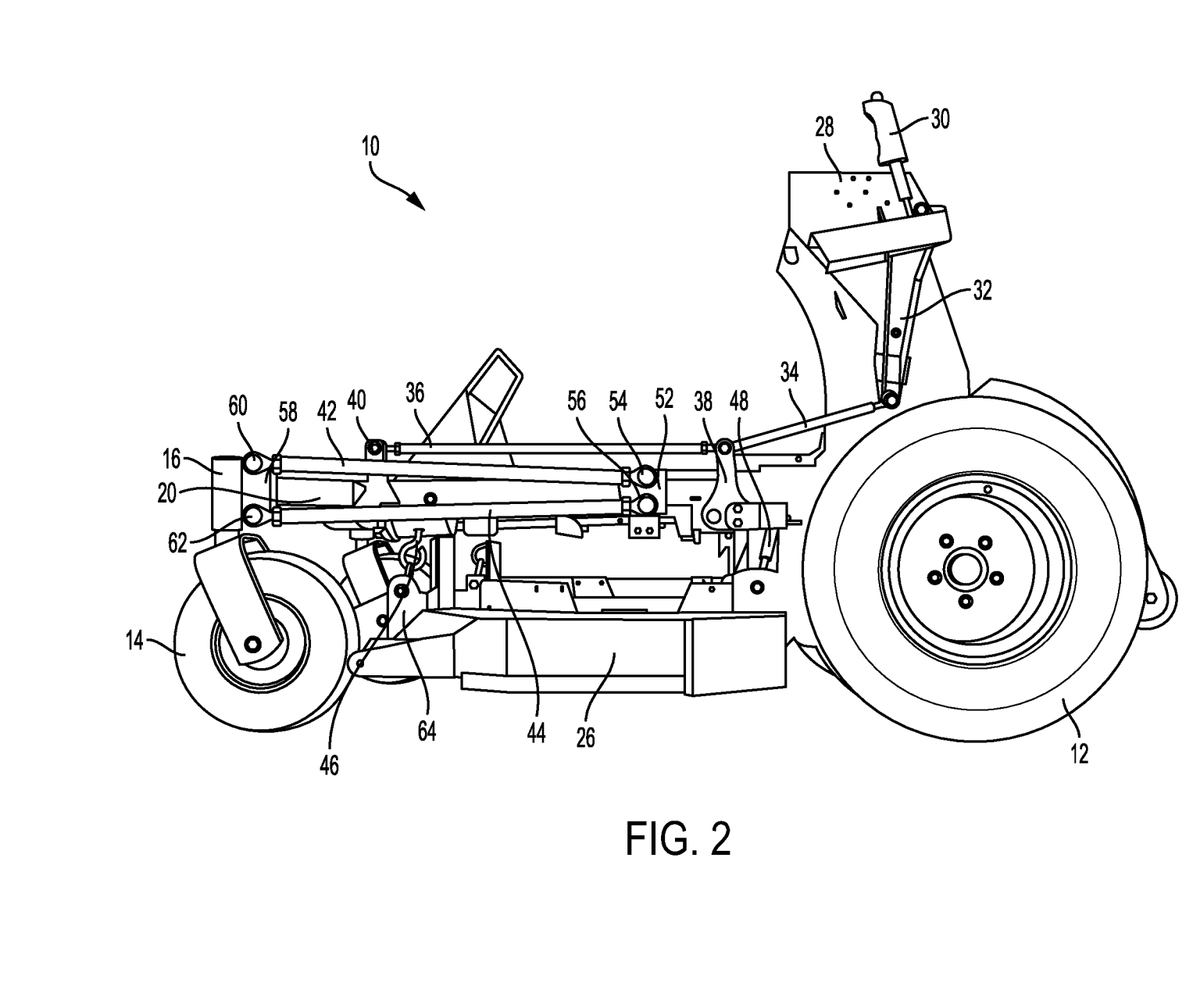
FIG. 2 is a side view of the stand-on mower illustrated in FIG. 1.

Referring still to FIGS. 1-5, a pair of upper radius rods 42 and a pair of lower radius rods 44 are pivotally coupled to both the main frame 18 and respective ends of front axle assembly 20. Specifically, as illustrated in FIG. 2, main frame 18 comprises a pivot block 52 affixed thereto to accommodate a first pivot joint 54 for the coupling of one end of upper radius rod 42, as well as a second pivot joint 56 for the coupling of one end of lower radius rod 44. Pivot block 52 may be affixed to main frame 18 through any appropriate means, such as welding, fasteners, etc. On front axle assembly 20, a pivot block 58 is affixed in order to accommodate a first pivot joint 60 for the coupling of the other end of upper radius rod 42, as well as a second pivot joint 62 for coupling the other end of lower radius rod 44. Like pivot block 52, pivot block 58 may be affixed to front axle assembly 20 via any appropriate means, such as welding, fasteners, etc. The location of pivot blocks 52 upon main frame 18 may vary from what is shown in FIGS. 1-5 and, thus, upper radius rods 42 and lower radius rods 44 may be longer or shorter than those illustrated.

With each respective upper radius rod 42 and lower radius rod 44 being pivotally coupled to both the main frame 18 and front axle assembly 20, front axle assembly 20 and front caster wheels 14 are still able to move (i.e., oscillate) about pivot pin 24 as the stand-on mower 10 traverses uneven terrain. However, the pair of respective upper radius rods 42 and lower radius rods 44 may act to limit the amount of rotation about pivot pin 24. That is, as the front axle assembly 20 oscillates, one of the front caster wheels 14 moves downward relative to main frame 18, while the other front caster wheel 14 moves upward an equal amount. Regardless of whether the front caster wheel 14 is moving upward or downward, one of the upper radius rod 42 or lower radius rod 44 is in tension, while the other of the upper radius rod 42 or lower radius rod 44 is in compression. Thus, while oscillation of front axle assembly 20 is still possible, the degree of rotation may be limited by respective upper radius rods 42 and lower radius rods 44.

While the respective upper radius rods 42 and lower radius rods 44 act to pivotally support and limit the oscillation of front axle assembly 20, upper radius rods 42 and lower radius rods 44 also provide structural support for front axle assembly 20 in the event of lateral forces or impacts on front axle assembly 20, particularly at or near respective caster assemblies 16. For example, if an operator were to drive the stand-on lawnmower 10 into a street curb, a large stone, etc., the impact may cause lateral forces to be imparted at or near one or more ends of front axle assembly 20. However, upper radius rods 42 and lower radius rods 44, pivotally mounted at pivot blocks 58, may provide lateral structural support to front axle assembly 20, thereby mitigating and/or preventing any damage to the front axle assembly 20 (e.g., bending, shearing, etc.), the pivot assembly 22, and/or main frame 18 due to such impacts.

Figure 4:
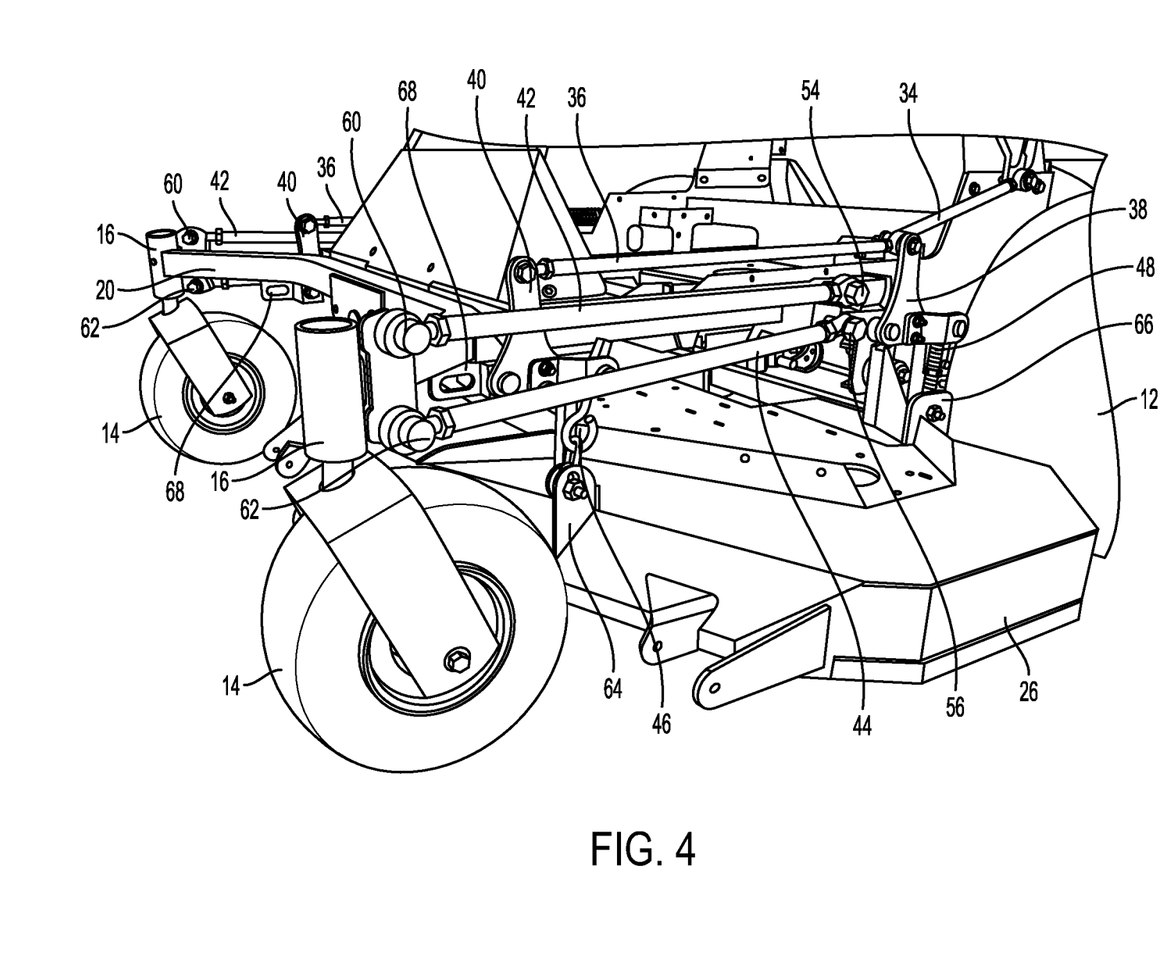
FIG. 4 is a partial front perspective view of the various linkage mechanisms and mower deck components in accordance with an aspect of the disclosure.

Referring now to FIGS. 4-5, greater details of the componentry of the oscillating front axle and mower deck lift system in accordance with the disclosure are shown. As described above, front axle assembly 20 and front caster wheels 14 are configured to move as the lawnmower 10 travels over uneven or rough terrain. However, if mower deck 26 does not correspondingly move in conjunction with the oscillation of front axle assembly 20, the mower deck 26 may "scalp" the mowing surface and/or the cut may be uneven. That is, if front caster wheels 14 oscillate to follow the terrain, but mower deck 26 does not, cut quality may be adversely affected. Accordingly, front bell cranks 40, which are coupled to a front portion of mower deck 26 via respective linkage members 46, are affixed or attached directly to a portion of the front axle assembly 20 at pivot blocks 68, as opposed to being affixed or attached to any portion of the main frame 18. Pivot blocks 68 may be affixed or attached to front axle assembly 20 via any appropriate means, such as welding, fasteners, etc.

In this way, as front axle assembly 20 oscillates and respective front caster wheels 14 move up and down, so too do pivot blocks 68 and front bell cranks 40, which correspondingly lifts and/or lowers a front portion of mower deck 26 via respective linkage members 46. This allows at least the front portion of mower deck 26 to also follow the undulations in the mowing surface. Linkage members 46 may be coupled to mower deck 26 at respective pivot blocks 64 on an external surface of mower deck 26. In some embodiments, linkage members 46 are formed at least partially as chains, allowing for linkage members 46 to flex as the front portion of mower deck 26 is lifted and/or lowered. However, any appropriate linkage mechanism between front bell cranks 40 and pivot blocks 64 may be utilized.

While it may be advantageous to allow the front portion of mower deck 26 to move relative to the upward and/or downward movement of front caster wheels 14, it may also be desirable to maintain the rear portion of mower deck 26 at a height above the mowing surface consistent with the terrain over which the rear drive wheels 12 are traveling. As differences in the terrain may occur along both the width of lawnmower 10 (i.e., side-to-side, between the caster wheels or between the drive wheels) and length of lawnmower 10 (i.e., front-to-back, between the caster wheels and the drive wheels), allowing the mower deck 26 to follow the terrain at or near the nearest wheel may result in higher cut quality and less scalping. Thus, in order to prevent linkage members 46 located at the front portion of mower deck 26 from equally lifting (or lowering) and entire front-to-back portion of the mower deck 26, spring linkages 48 may be coupled between respective rear bell cranks 38 and pivot blocks 66 disposed on a rear portion of mower deck 26. As front linkage members 46 lift (or lower) the front portion of mower deck 26, spring linkages 48 are biased in a way to prevent the rear portion of mower deck 26 from lifting (or lowering) directly in proportion to the lift of the front portion, thus allowing for the rear portion of mower deck 26 to more closely follow the terrain seen at or near the rear drive wheels, as opposed to only following the terrain seen at or near the front caster wheels.

As described above, the operator may manually lift and lower mower deck 26 by manipulating the deck height control handle 30 and deck height control lever 32, which is coupled through a variety of linkages to both the rear bell cranks 38 and the front bell cranks 40. However, as front bell cranks 40 are coupled to oscillating front axle assembly 20, movement of the front axle assembly 20 as the lawnmower 10 travels across undulating or rough terrain also equates to corresponding movement of front bell cranks 40. As front bell cranks 40 are pivotally coupled to linkages 36, which are themselves pivotally coupled to rear bell cranks 38, movement of front bell cranks 40 due to oscillation of front axle assembly 20 also causes movement of rear bell cranks 38. Thus, if one of the rear bell cranks 38 were coupled to deck height control lever 32 via a fixed linkage, the oscillating movement of front axle assembly 20 would reverberate all the way to deck height control lever 32 and deck height control handle 30, which may undesirably alter operator settings for mower deck height.

However, in accordance with an aspect of this disclosure, and in order to avoid such undesirable movement of deck height control lever 32, rear bell crank 38 is not coupled to deck height control lever 32 via a fixed linkage. Rather, a mechanical decoupler linkage 34 is pivotally coupled between one of the rear bell cranks 38 and deck height control lever 32, with decoupler linkage 34 being configured as a rod-within-a-tube. That is, the end of decoupler linkage 34 that is coupled to bell crank 38 is formed as an elongated rod portion, while the end of decoupler linkage 34 that is coupled to deck height control lever 32 is formed as a tube through which the elongated rod portion may slidably fit. During normal operation of lawnmower 10, decoupler linkage 34 is under compression as it supports mower deck 26, with an internal end of the elongated rod contacting a stop within an upper end of the tube. However, if there is movement the of the rear bell crank 38 due to corresponding movement of front bell crank 40 from external forces (e.g., due to impacts, bumps, etc.), decoupler linkage 34 prevents undesirable pull on deck height control lever 32, as decoupler linkage 34 is configured to account for most or all of the forces imparted by bell crank 38 in this direction by allowing the elongated rod portion to freely move away from the stop within the tube portion of decoupler linkage 34. In this way, movement of deck lift components such as bell cranks 38, 40 and linkages 36 due to movement of front axle assembly 20 do not result in substantial feedback to deck height control lever 32.

Referring to FIG. 5, additional details regarding pivot assembly 22 are shown. As described above, pivot assembly 22 may include a pivot pin 24, about which front axle assembly 20 is able to move when traversing uneven or rough terrain. Pivot assembly 22 may further include a bushing 70 positioned around pivot pin 24, wherein bushing 70 is configured to dampen the movement (i.e., oscillation) of front axle assembly 20. In some embodiments, bushing 70 may be formed as a rubber bushing, a polytetrafluoroethylene-coated bushing, or other elastomeric bushing.

Additionally and/or alternatively, pivot assembly 22 may also include a pair of limit pins 72 passing through the mounting plates of pivot assembly 22 at opposite sides of pivot pin 24. Limit pins 72 extend away from front axle assembly 20 in the direction of main frame 18, and are spaced below front axle assembly 20 within the pivot assembly 22. Accordingly, as the front axle assembly 20 oscillates about pivot pin 24, limit pins 72 may alternately contact a bottom surface of main frame 18 so as to limit the degree of rotation of the front axle assembly 20, dependent upon the direction of vertical movement of the respective front caster wheels 14. For example, if the right front caster wheel 14 is moved vertically upward by the oscillating front axle assembly 20, the right-side limit pin 72 may eventually contact the main frame 18 to limit the amount of vertical movement of right front caster wheel 14. With this configuration, stand-on lawnmower 10 is not reliant upon only bushing 70 and/or radius rods 42, 44 to control the travel and torsional forces experienced by front axle assembly 20.

While FIGS. 1-5 illustrate a stand-on lawnmower, it is to be understood that the features described herein may also be applicable to other types of outdoor power equipment, such as ride-on lawnmowers, walk-behind lawnmowers, aerators, stand-on blowers, brushcutters, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A lawnmower comprising:
   a frame having a first end portion and a second end portion;
   a pair of drive wheels coupled to the second end portion of the frame;
   a front axle assembly comprising a bar pivotally coupled to the first end portion of the frame about a pivot axis;
   a first caster wheel coupled to a first lateral end of the bar and a second caster wheel coupled to a second lateral end of the bar, wherein when the bar pivots about the pivot axis, the first caster wheel moves upward relative to the frame and the second caster wheel moves downward relative to the frame;
   a first rod pivotably coupled to the frame and pivotably coupled to the first lateral end of the bar;
   a second rod pivotably coupled to the frame and pivotably coupled to the second lateral end of the bar; and
   a mower deck coupled to the frame.

2. The lawnmower of claim 1, further comprising a pivot assembly, wherein the front axle assembly is configured to oscillate about a pivot pin of the pivot assembly.

3. The lawnmower of claim 2, wherein the pivot assembly comprises a limit pin configured to contact a surface of the frame to limit rotation of the front axle assembly relative to the frame.

4. The lawnmower of claim 3, wherein the limit pin is spaced below the front axle assembly within the pivot assembly.

5. The lawnmower of claim 3, wherein the limit pin is a first limit pin, the pivot assembly further comprising a second limit pin, wherein the first limit pin and the second limit pin are configured to alternately contact the surface of the frame so as to limit rotation of the front axle assembly.

6. The lawnmower of claim 2, further comprising an elastomeric bushing disposed over the pivot pin, wherein the elastomeric bushing is configured to dampen movement of the front axle assembly.

7. The lawnmower of claim 1, wherein the first rod and the second rod are configured to limit a degree of rotation of the front axle assembly about the pivot axis, wherein when the first rod is in tension the second rod is in compression.

8. The lawnmower of claim 1, further comprising a deck height control lever coupled to at least one rear bell crank and at least one front bell crank, wherein both the at least one rear bell crank and the at least one front bell crank are coupled to the mower deck to control height of the mower deck relative to a mowing surface.

9. The lawnmower of claim 8, wherein the at least one rear bell crank is coupled to the frame, and further wherein the at least one front bell crank is coupled to the front axle assembly.

10. The lawnmower of claim 8, wherein the at least one rear bell crank is coupled to the mower deck by at least one spring-biased linkage.

11. The lawnmower of claim 8, wherein the at least one front bell crank is coupled to the mower deck by at least one chain linkage.

12. The lawnmower of claim 8, wherein the deck height control lever is coupled to the at least one rear bell crank by a mechanical decoupler linkage assembly.

13. The lawnmower of claim 8, wherein the at least one rear bell crank is coupled to the at least one front bell crank by a linkage rod.

14. The lawnmower of claim 1, further comprising an operator standing platform and a control tower.

15. A lawnmower comprising:
    a frame having a first end portion and a second end portion;
    a pair of drive wheels coupled to the second end portion of the frame;
    a front axle assembly comprising a bar pivotally coupled to the first end portion of the frame about a pivot pin;
    a first caster wheel coupled to a first lateral end of the bar and a second caster wheel coupled to a second lateral end of the bar, wherein when the bar pivots about the pivot pin, the first caster wheel pivots about the pivot pin;
    a first rod pivotally coupled between the frame and the first lateral end of the bar;
    a second rod pivotally coupled between the frame and the second lateral end of the bar; and
    a mower deck, wherein the mower deck is coupled to the frame by a first linkage, and the mower deck is coupled to the front axle assembly by a second linkage; wherein when the bar pivots about the pivot pin, the second caster wheel, the second linkage, and mower deck move relative to the frame.

16. The lawnmower of claim 15, wherein the first rod is located above the second rod.

17. The lawnmower of claim 15, further comprising a deck height control lever coupled to the first linkage and the second linkage, wherein both the first linkage and the second linkage comprise a bell crank to control height of the mower deck relative to a mowing surface.

18. A lawnmower comprising:
a frame having a first end portion and a second end portion;
a pair of drive wheels coupled to the second end portion;
a front axle assembly comprising a bar pivotally coupled to the first end portion of the frame about a single axis;
a pair of caster wheels directly coupled to respective ends of the bar;
a plurality of rods having a first end and a second end, the first end of the plurality of rods being pivotally coupled to the frame, the second end of the plurality of rods being pivotally coupled to the front axle assembly;
a first bell crank pivotally coupled to the front axle assembly;
a second bell crank pivotally coupled to the frame; and
a mower deck coupled to the first bell crank and the second bell crank; and
wherein the plurality of rods are configured to limit a degree of rotation of the front axle assembly about the single axis.

19. The lawnmower of claim 18, further comprising a linkage rod pivotally coupled to the first bell crank and the second bell crank, wherein the mower deck comprises a front portion and a rear portion, wherein the first bell crank is coupled to the front portion of the mower deck, and wherein the second bell crank is coupled to the rear portion of the mower deck.

20. The lawnmower of claim 18, further comprising a deck height control lever coupled to the second bell crank.

* * * * *